United States Patent [19]
Butler et al.

[11] Patent Number: 5,739,868
[45] Date of Patent: Apr. 14, 1998

[54] APPARATUS FOR PROCESSING MIXED YUV AND COLOR PALETTIZED VIDEO SIGNALS

[75] Inventors: Donald S. Butler; Richard S. Amano, both of Scottsdale, Ariz.

[73] Assignee: General Instrument Corporation of Delaware, Hatboro, Pa.

[21] Appl. No.: 523,396

[22] Filed: Aug. 31, 1995

[51] Int. Cl.$^6$ .............................. H04N 9/74; H04N 5/262

[52] U.S. Cl. ..................... 348/584; 348/585; 348/589; 348/591; 348/600; 348/659

[58] Field of Search ............................... 348/584–586, 348/589, 591, 595, 600, 659, 660; 345/115, 116, 153; H04N 9/74, 5/262

[56] References Cited

U.S. PATENT DOCUMENTS

| | | | |
|---|---|---|---|
| 4,420,770 | 12/1983 | Rahman | 358/183 |
| 4,580,165 | 4/1986 | Patton et al. | 358/148 |
| 4,737,772 | 4/1988 | Nishi et al. | 340/703 |
| 4,754,270 | 6/1988 | Murauchi | 340/731 |
| 4,876,600 | 10/1989 | Pietzsch et al. | 358/183 |
| 4,951,038 | 8/1990 | Yamamura | 340/725 |
| 4,965,670 | 10/1990 | Klinefelter | 358/183 |
| 5,056,143 | 10/1991 | Greaves et al. | 340/701 |
| 5,065,231 | 11/1991 | Greaves et al. | 358/22 |
| 5,089,811 | 2/1992 | Leach | 348/584 |
| 5,179,642 | 1/1993 | Komatsu | 395/135 |
| 5,185,597 | 2/1993 | Pappas et al. | 340/709 |
| 5,235,677 | 8/1993 | Needle et al. | 395/131 |
| 5,258,826 | 11/1993 | Wakeland et al. | 358/12 |
| 5,258,843 | 11/1993 | Truong | 358/183 |
| 5,313,231 | 5/1994 | Yin et al. | 345/199 |
| 5,355,175 | 10/1994 | Okada et al. | 348/595 |
| 5,357,286 | 10/1994 | Hwang | 348/589 |
| 5,389,947 | 2/1995 | Wood et al. | 345/145 |
| 5,579,028 | 11/1996 | Takeya | 345/115 |
| 5,579,057 | 11/1996 | Banker et al. | 348/589 |

*Primary Examiner*—Glenton B. Burgess
*Attorney, Agent, or Firm*—Irwin Ostroff; Erwin W. Pfeifle

[57] ABSTRACT

Apparatus processes mixed YUV and color palettized video signals for display on an interlaced NTSC or PAL television receiver by storing first and second fields of one or more sprites in a graphic memory. Each sprite is stored as YUV or color palettized data and given a priority. A higher priority sprite overwrites pixel data of sprites of a lower priority when sprites overlap. First and second adjacent horizontal lines of pixel data in the first and second fields, respectively, are concurrently stored in respective first and second double buffers of a pixel assembly buffer during each line period. A delay buffer and the first and second double buffers generate first, second, and third adjacent horizontal lines, respectively, of pixel data at the output of the pixel assembly buffer while third and fourth adjacent horizontal lines of pixel data are inputted to the first and second double buffers. A convolving means receives the first, second, and third output signals from the pixel assembly buffer and generates therefrom an output signal providing a weighted average for a central pixel of a predetermined matrix of pixel data for transmission to the television receiver when a sprite is included in a pixel area of the television receiver. A live video signal is transmitted to the display of the television receiver when no sprite is included in a pixel area of the television receiver.

22 Claims, 5 Drawing Sheets

APPARATUS FOR PROCESSING MIXED YUV AND COLOR PALETTIZED VIDEO SIGNALS

CROSS REFERENCE TO RELATED APPLICATIONS

This invention is related to the following applications, all of which are assigned to the assignee of the present invention, have common inventors, and are being filed concurrently: U.S. patent application Ser. No. 08/523,395 (GID872), entitled "Method and Apparatus For Performing Two Dimensional Video Convolving", U.S. patent application Ser. No. 08/523,789 (GID907), entitled "Video Magnification Apparatus", and U.S. patent application Ser. No. 08/523,394 (GID908), entitled "Apparatus Using Memory Control Tables Related To Video Graphics Processing For TV Receivers".

1. Field of the Invention

The present invention relates to apparatus for processing mixed YUV and color palettized graphic video signals and displaying such graphic video signals by themselves or superimposing such mixed graphic video signals on live television signals received from a remote source when desired.

2. Background of the Invention

Some commercially available computers, particularly personal computers, provide circuitry which permits a merger of a composite video signal (e.g., a National Television Standards Committee signal) with computer generated video graphics display signals, typically red, green, and blue (RGB). More particularly, modern video graphics equipment has the ability to produce backgrounds, characters, symbols, and other pictorial representations and arrangements in operator-selected sizes, shapes, and colors.

U.S. Pat. No. 4,737,772 (Nishi et al.), issued on Apr. 12, 1988, discloses a video display controller comprising a video display processor (VDP), a Central Processing Unit (CPU), a memory, and a Video Random Access Memory (VRAM). The memory stores both programs to be executed by the CPU and various kinds of image data. The VRAM stores image data which the VDP can change and then transfer to the outside for display on a screen of a Cathode Ray Tube (CRT) display. In the VDP, a timing signal generator generates timing signals for correctly scanning elements of the picture to be displayed which are used by a horizontal and a vertical counter and the CRT display to synchronize data processing in an image data processing circuit (IDPC) and correctly display such processed data on the screen of the CRT display. A Video Digitizer samples an externally supplied analog video signal and converts signal levels or amplitudes of the analog video signal into digital data composed of 2 or 4 bits each. The Video Digitizer digitized amplitude output data represents a still image and is supplied to the IDPC. The IDPC selectively stores both the Video Digitizer output data and color codes supplied from the CPU into the VRAM through an interface circuit. Each color code from the CPU represents a color of a respective one of the display elements (e.g. pixel) constituting a still image on the screen. In operation, in response to a display command from the CPU, the IDPC sequentially reads dot data from the VRAM in synchronization with the scanning position on the CRT display and outputs the dot data to a color palette circuit. Concurrently, the IDPC calculates and reads data necessary for displaying an animation image from the VRAM and supplies color codes to the color palette circuit. Where an animation and still image are located at a same display position on the screen of the CRT display, the animation image is preferably displayed. The color palette circuit converts each color code into three color data for red, green, and blue, each composed of three bits. A Digital to Analog Converter (DAC) converts the color data from the color palette circuit into R, G, and B signals which are provided to the CRT display.

U.S. Pat. No. 5,355,175 (Okada et al.), issued on Oct. 11, 1994, discloses video mixing apparatus that mixes a graphics video image and a playback video image at a plurality of mixture ratios in one image plane. Fade data indicative of the mixing ratio of at least one line of the playback video signal and the graphics video signal is sequentially generated in accordance with a predetermined order. The fade data is held in holding means and is outputted from the holding means synchronously with a horizontal sync signal. The levels of the playback video signal and the graphics video signal are individually adjusted in accordance with the fade data outputted from the holding means, and the adjusted signals are added together. The playback video signal and the graphics video signal are mixed at the mixing ratio set for every line on one image plane to generate a video output signal from the apparatus.

U.S. Pat. No. 4,420,770 (Rahman), issued on Dec. 13, 1983, discloses a video background generation system for generating rectangular video patterns having operator-selected video attributes. The system comprises a horizontal bit memory and a vertical bit memory, each of the memories being a 16 entity memory for storing information for 16 background entities. The memory for each background entity defines opposite corners of the background area for an entity on the screen. As shown in FIG. 2 of the patent, a first entity defines a first rectangular area, and a second higher priority entity defines a second partially overlapping rectangular area. An attribute look-up table stores information for each entity related to the color video output (red, green, blue) for that entity. During the scanning of the lines of a picture being produced, the first entity is produced in its defined area and the second entity is produced in its defined area. However, the second entity has a higher priority which results in the overlapping region of the two entities to be presented with the stored attributes of the second entity.

U.S. Pat. No. 4,580,165 (Patton et al.), issued on Apr. 1, 1986, discloses a graphics video overlay system that synchronizes a color graphics module both horizontally and vertically with an externally received video signal. More particularly, the system comprises a color graphics module and a video mixing module that are coupled together to provide a graphics image overlaid on a video image. The color graphics module comprises timing means for producing both color graphics horizontal and vertical sync pulses. The video mixing module comprises a video decoder and sync processor means. The video decoder separates an externally received video signal into red, green, and blue (RGB) components and generates therefrom an external video composite sync signal. The sync processor means comprises horizontal and vertical sync processor means that synchronize color graphics signals both horizontally and vertically with the video composite sync signals. The horizontal sync processor means filters the external video composite sync signal and generates a processed horizontal sync pulse that is phase adjustable. The vertical sync processor means uses the external video composite sync signal to generate external video vertical sync signals for vertically synchronizing the video image and the color graphics image. A multiplexer combines the video image with the color graphics image to provide a composite image output signal.

Presently, there is emerging a need for interactive video graphics which will enable a whole new class of services to be delivered to the home via a cable television network. These new services will enhance the viewing experience for many traditional television programs while providing augmented services to others. However, NTSC and Phase Alternating Line (PAL) television receivers, unlike computer monitors, have a fairly low video bandwidth and employ an interlaced, not a progressive scan, display. These limitations place severe constraints on the generation of an artifact free high resolution synthetic video signal. Traditionally, consumer products, such as video games, avoid these problems by generating low resolution non-interlaced video signals. This approach results in images that are of low quality, have a "blocky" appearance, are limited in color choice, and take on a cartoon-like look. The generation of synthetic video that approaches broadcast quality requires that the generated synthesized signals emulate that of a video camera scanning a scene and the subsequent analog signal processing for such video camera signals. Therefore, it is desirable to provide a relatively inexpensive arrangement that permits good synthetic video graphics to be overlaid on top of live television programming for viewing on a standard NTSC or PAL standard interlaced television receivers.

SUMMARY OF THE INVENTION

The present invention is directed to apparatus for processing mixed YUV and color palettized graphic video signals and displaying such graphic video signals by themselves or superimposing such mixed graphic video signals on live television signals received from a remote source when desired on an interlaced television receiver.

Viewed from one aspect, the present invention is directed to apparatus for processing mixed video and graphic signals for display on a standard interlaced television receiver. The apparatus comprises buffering and processing means and convolving means. The buffering and processing means is responsive to a reception of first and second horizontal lines of sprite pixel data from first and second fields, respectively, of each of one or more sprites to be selectively displayed in separate selected predetermined areas of a display of the standard interlaced television receiver. The buffering and processing means generates from the sprite pixel data from first and second fields of each of the one or more sprites, first, second, and third output signals including sequential sprite pixel data for three adjacent horizontal lines of a picture for display on the television receiver. In generating the first, second, and third output signals, the pixel data for sprites of a highest priority are outputted for each pixel position of the first, second, and third output signal at any instant of time when sprites overlap an area of the display on the television receiver. Still further, the first and third output signals include sprite pixel data for lines of one of the first and second fields, and the second output signals includes sprite pixel data for lines of the other one of the first and second fields and includes chrominance data when the sprite data relates to the true color format. The convolving means receives the first, second, and third output signals from the buffering and processing means and generates therefrom an output signal providing a weighted average for a central pixel of a predetermined matrix of pixel data. This output signal is transmitted to the television receiver when a sprite is included in a pixel area of the display of the television receiver, and the central pixel is part of the second output signal from the buffering and processing means. Still further, the convolving means transmits a live video signal to the display of the television receiver when no sprite is included in a pixel area of the display of the television receiver.

Viewed from another aspect, the present invention is directed to apparatus for processing mixed video and graphic signals for display on a standard interlaced television receiver. The apparatus comprises digital memory means, buffering and processing means, and convolving means. The digital memory means stores, and subsequently transmits an output signal comprising, sprite data for each of one or more sprites to be selectively displayed in selected predetermined areas of a display of the standard interlaced television receiver. The sprite data comprises either one of a true color video or a color palette data format for a first and second field of a sprite picture to be displayed on the television receiver, and each of the one or more sprites has a predetermined priority when there is more than one sprite. The buffering and processing means is responsive to the output signal from the digital memory means for generating therefrom first, second, and third output signals. The three output signals including sequential sprite pixel data for three adjacent horizontal lines of a picture for display on the television receiver. Still further, pixel data for sprites of a highest priority are outputted for each pixel position of the first, second, and third output signal at any instant of time when sprites overlap an area of the display on the television receiver. Additionally, the first and third output signals include sprite pixel data for lines of one of the first and second fields, and the second output signals includes sprite pixel data for lines of the other one of the first and second fields and includes chrominance data when the sprite data relates to the true color format. The convolving means receives the first, second, and third output signals from the buffering and processing means and generates therefrom an output signal providing a weighted average for a central pixel of a predetermined matrix of pixel data for transmission to the television receiver. This output signal is transmitted to the television receiver when a sprite is included in a pixel area of the display of the television receiver, and the central pixel is part of the second output signal from the buffering and processing means. Still further, the convolving means transmits a live video signal to the display of the television receiver when no sprite is included in a pixel area of the display of the television receiver.

Viewed from still another aspect, the present invention is directed to apparatus for processing mixed video and graphic signals for display on a standard interlaced television receiver. The apparatus comprises digital memory means, a memory controller, buffering and processing means, and convolving means. The digital memory means stores, and subsequently transmits an output signal comprising, sprite data for each of one or more sprites to be selectively displayed in selected predetermined areas of a display of the standard interlaced television receiver. The sprite data comprises either one of a true color video or a color palette data format for a first and second field of a sprite picture to be displayed on the television receiver, and each of the one or more sprites has a predetermined priority when there is more than one sprite. The memory controller causes sprite data of the first and second fields to be read into predetermined locations of the digital memory means and to be subsequently selectively read out of the digital memory means as a memory output signal including a horizontal line of sprite data of the first field and an adjacent line of sprite data from the second field. The buffering and processing means is responsive to the memory output signal from the memory controller for generating therefrom first, second, and third output signals including sequential sprite pixel data for three adjacent horizontal lines of a picture for display on the television receiver. Still further, pixel data for sprites of a highest priority are outputted for each pixel position of the first, second, and third output signal at any instant of time when sprites overlap an area of the display on the television receiver. Additionally, the first and third output signals include sprite pixel data for lines of one of the first and second fields, and the second output signals includes sprite pixel data for lines of the other one of the first and second fields and includes chrominance data when the sprite data relates to the true color format. The convolving means receives the first, second, and third output signals from the buffering and processing means and generates therefrom an output signal providing a weighted average for a central pixel of a predetermined matrix of pixel data for transmission to the television receiver. This output signal is transmitted to the television receiver when a sprite is included in a pixel area of the display of the television receiver, and the central pixel is part of the second output signal from the buffering and processing means. Still further, the convolving means transmits a live video signal to the display of the television receiver when no sprite is included in a pixel area of the display of the television receiver.

The invention will be better understood from the following more detailed description taken with the accompanying drawings.

DETAILED DESCRIPTION

It is to be understood that corresponding elements performing the same function in each of the figures have been given the same designation number.

Figure 1:
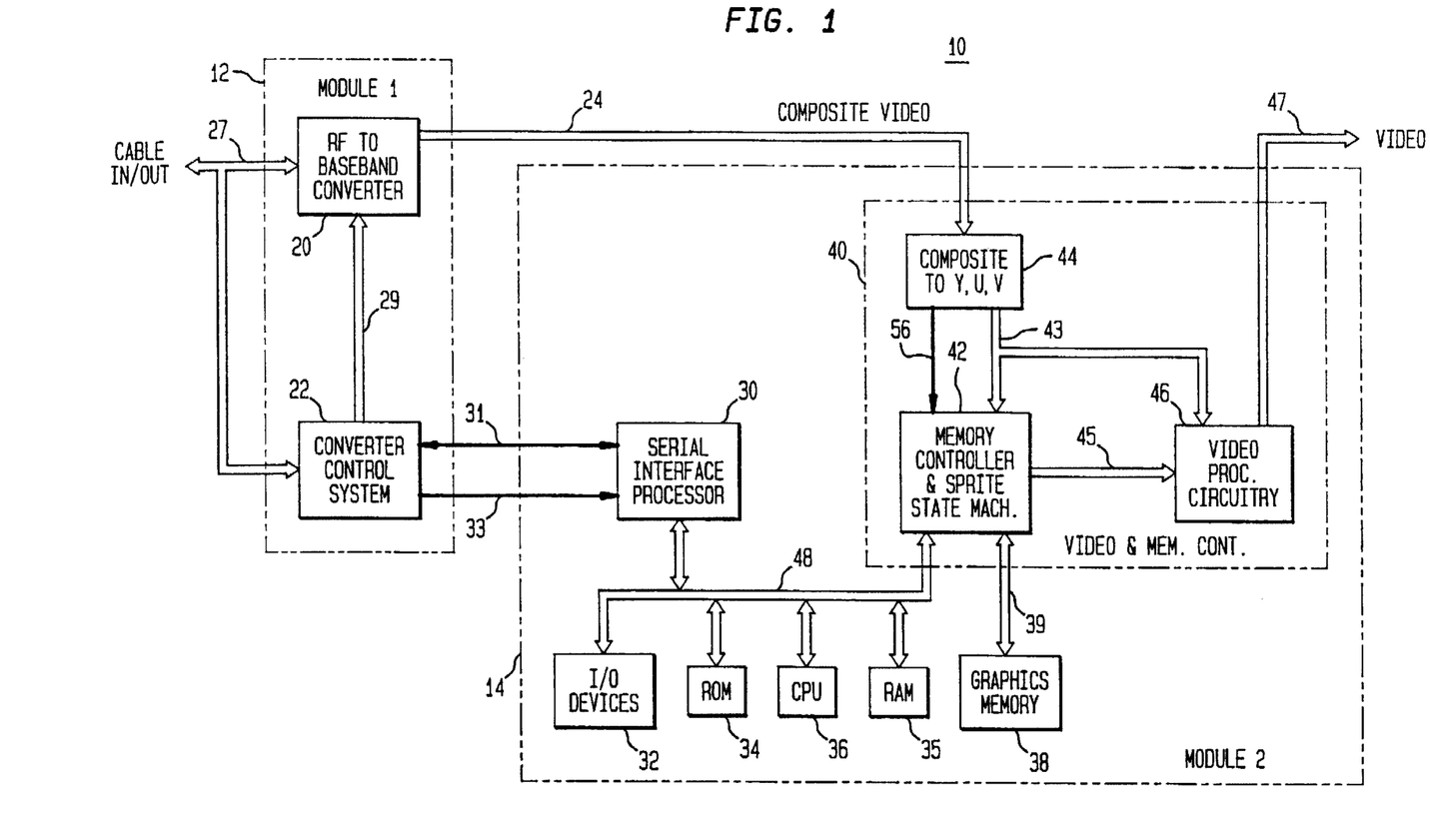
FIG. 1 is a block diagram of a subscriber cable box unit in accordance with the present invention.

Referring now to FIG. 1, there is shown a block diagram of a subscriber cable box unit 10 that can be found on a subscriber's premises and provides interactive video processing in accordance with the present invention. The subscriber cable box unit 10 comprises a first module (MODULE 1) 12 (shown within a first dashed line rectangle) and a second module (MODULE 2) 14 (shown within a second dashed line rectangle). The first module 12 is a conventional arrangement that comprises a Radio Frequency (RF) to Baseband Converter 20 and a Converter Control System 22, which are each known in the art. The RF to Baseband Converter 20 receives multiplexed RF television channel signals in the NTSC or PAL standard format propagating on a cable 27 from a remote cable company central office (not shown), and selectively converts such multiplexed RF television channel signals from their multiplexed channel frequencies to baseband frequencies. The RF to Baseband Converter 20 transmits a resultant baseband composite video output signal from the conversion process over a bus 24 to the second module 14. The Converter Control System 22 is user (subscriber) is typically controlled by either an Infra Red remote control device or a keypad on the cable box as is well known in the art. The Converter Control System 22 functions to receive and/or transmit authorization and access control signals via the cable 27 to or from a remote cable company central office, activate baseband video scrambling or descrambling, and produce On Screen Display (OSD) messaging. The Converter Control System 22 outputs control signals via a bus 29 to the RF to Baseband Converter 20 for selecting desired channel programming, and various control and decrypted data signals (e.g., control and upstream data output signals, Infra Red receive and transmit signals, and decrypted T1 Quadrature Phase Shift Keying data signals) via leads 31 and 33 to the second module 14.

The second module 14 comprises a Serial Interface Processor (SIP) 30, Input/Output (I/O) devices 32, a Read Only Memory (ROM) 34, a Random Access Memory (RAM) 35, a Central Processing Unit (CPU) 36, a Graphics Memory 38, and a Video and Memory Control (VIDEO & MEM. CONT.) integrated circuit 40 (shown within a dashed line rectangle). The SIP 30, I/O devices 32, ROM 34, RAM 35, CPU 36, and a Memory Controller and Sprite State Machine (MACH.) 42 of the Video and Memory Control integrated circuit 40 are interconnected by a data bus 48. The CPU 36 can comprise any suitable processing unit and, in accordance with the present invention, is a 386 type CPU which is relatively inexpensive. The ROM 34 can comprise any suitable memory as, for example, an EPROM for initialization purposes and for programming of the CPU 36. The RAM 35 can comprise any suitable memory as, for example, two 256 Kilobyte-by-16 bit DRAMs connected in series to provide a 512K-by-16 bit RAM configuration for use as a scratchpad memory for the CPU 36. The Graphics Memory 38 can comprise any suitable memory as, for example, a 32 bit wide RAM area or preferably two 256K-by-16 bit DRAMs arranged in parallel for use with a 32-bit wide bus 39. The Graphics Memory 38 is used to store sprite data relating to graphics and video pictures. The use of a 32-bit wide bus 39 permits the use of fast-page mode memory addressing for both a Memory Controller and Sprite State Machine 42 and a block memory mover (not shown) forming part of the Video and Memory Controller 40. By significant use of block mode memory addressing, an average data transfer rate of approximately 52 nanoseconds can be achieved, which corresponds to processing approximately 77 million bytes of data per second.

The SIP 30 functions to handle data communications between the first module 12 and the second module 14. More particularly, the SIP 30 handles all data transfer signals between the second module 14 and the converter control system 22 of the first module 12. These data transfer signals can have formats such as, for example, a T1-like data stream at 1.5 Mbits/second which involves the bulk of the communication transfers, and raw data from an infrared receiver (not shown) in the converter control system 22. The SIP 30 can also include a full duplex synchronous serial port (not shown) for future expansion. Such data transfer signal formats are used to communicate between the converter control system 22 on the first module 12 and the CPU 36 in the second module 14 to activate desired actions in the second module 14.

The Video and Memory Control integrated circuit 40 comprises the Memory Controller and Sprite State Machine 42, Composite to YUV circuitry 44, and Video Processing (PROC.) circuitry 46. The Memory Controller and Sprite State Machine 42 is coupled to the Graphics Memory 38 by a data bus 39, and to the Video Processing circuitry 46 by a data bus 45. The Composite to YUV circuitry 44 receives the baseband composite video signal from the bus 24 and outputs resultant YUV video signals to the Memory Controller and Sprite State Machine 42 on a bus 43. The Video Processing circuitry 46 receives video signals from the Memory Controller and Sprite State Machine 44 over the data bus 45, and outputs NTSC or PAL standard video signals on a bus 47 to a remote television receiver (not shown) or further processing circuitry (not shown). It is to be understood that the present invention lies within the area of the Video and Memory Control integrated circuit 40 and the Graphics Memory 38. The elements of the first module 12 and the second module 14 were introduced and discussed hereinbefore for a better understanding of how the present invention fits into the interactive subscriber cable box unit 10.

Figure 2:
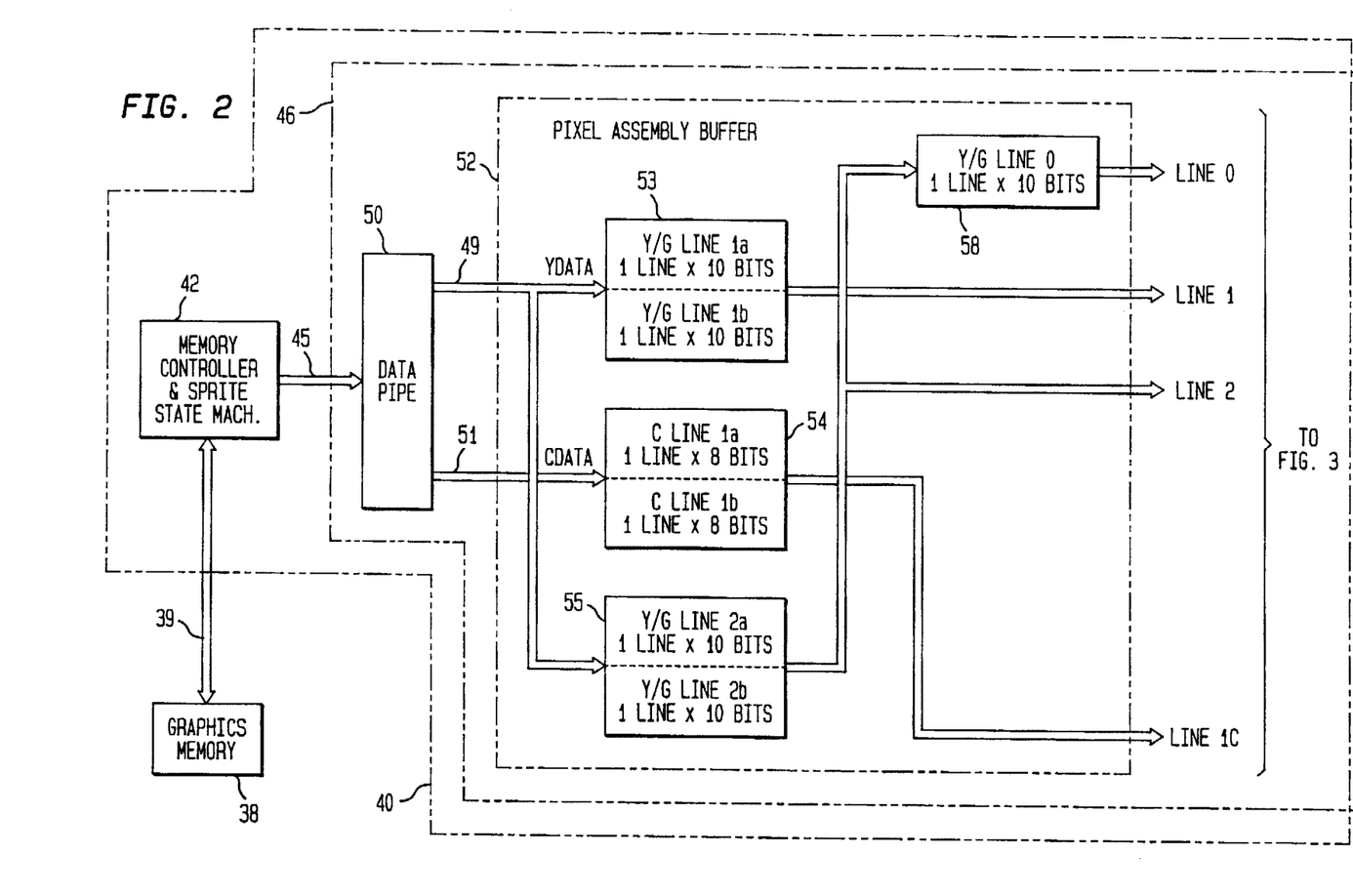
FIG. 2 is a block diagram of a first portion of a Video Processing Circuitry found in the subscriber cable box unit of FIG. 1 in accordance with the present invention.
Figure 3:
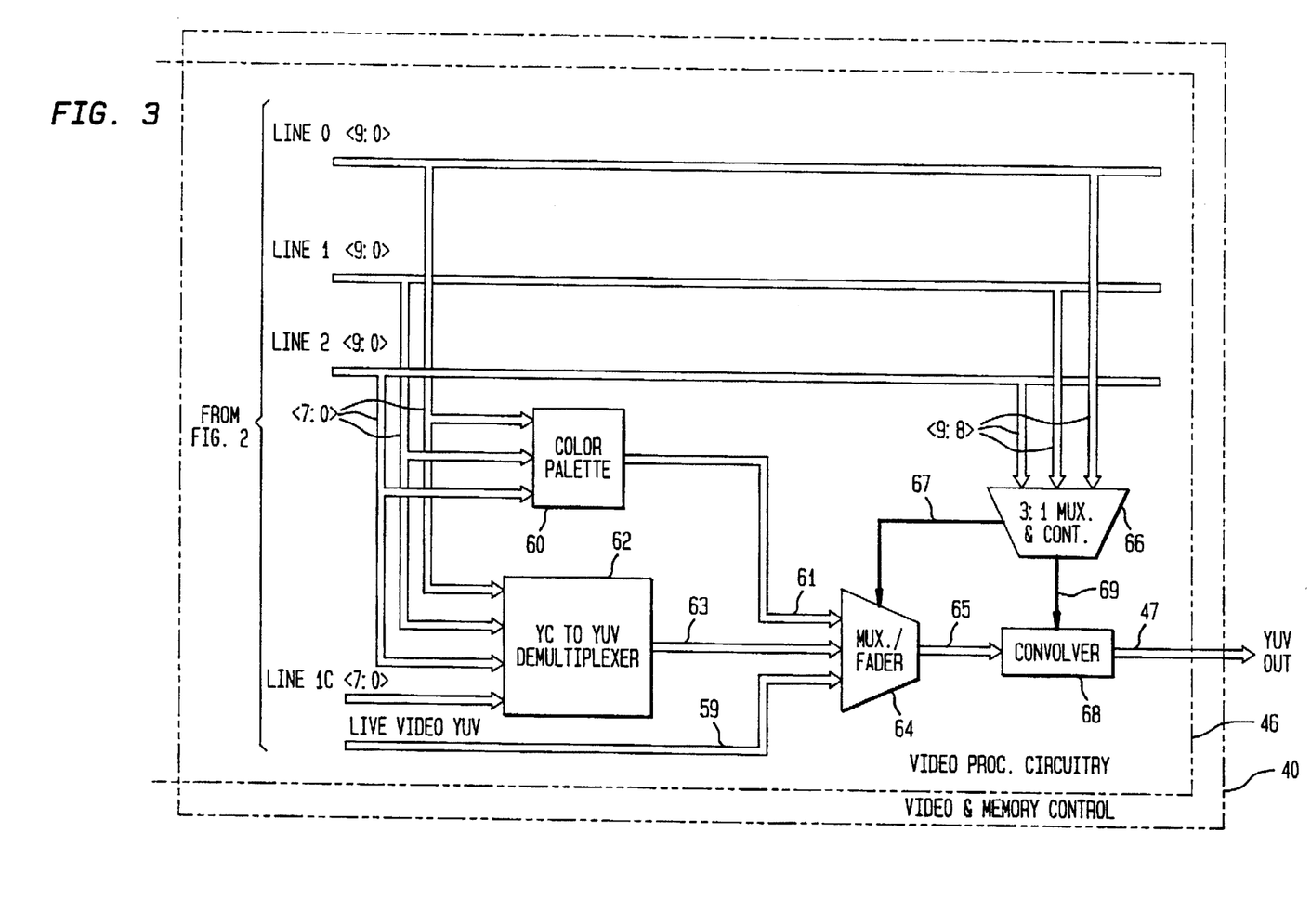
FIG. 3 is a block diagram of a second portion of a Video Processing Circuitry found in the subscriber cable box unit of FIG. 1 in accordance with the present invention.

Referring now to FIGS. 2 and 3, there are shown block diagrams of first and second portions, respectively, of a Video Processing Circuitry 46 (shown within a dashed line area) found in the second module 14 of the subscriber cable box unit 10 of FIG. 1 in accordance with the present invention. As is shown in FIG. 2, a Graphics Memory 38, forming an element of the second module 14 of FIG. 1, is coupled via a data bus 39 to a Memory Controller and Sprite State Machine 42 which is part of a Video and Memory Controller 40 (shown within a dashed line area) of the second module 14 of FIG. 1. A first portion of the Video Processing Circuitry 46 comprises a Data Pipe 50, and a Pixel Assembly Buffer 52 (shown within a dashed line rectangle). The Data Pipe 50 receives data over a bus 45 that was obtained by the Memory Controller and Sprite State Machine 42 from the Graphics Memory 38 for a particular sprite for transmission to the Pixel Assembly Buffer 52. More particularly, the Data Pipe 50 receives data for a sprite from the Graphics Memory 38 via the Memory Controller and Sprite State Machine 42 and provides separate outputs as to luminance data (ydata) and chrominance data (cdata) for transmission to the Pixel Assembly Buffer 52.

The Pixel Assembly Buffer 52 comprises first, second, and third double line buffers 53, 54, and 55, respectively, and a Y/G Line 0 buffer 58. The first double line buffer 53 is used for storing Y/G (luminance) line 1a data and Y/G line 1b data for first and second lines of a first field of a sprite picture received via a bus 49 from the Data Pipe 50. The line luminance data comprises 10 bits (bits 9-0) of data and control for each pixel of a line. The second double line buffer 54 is used for storing C (chrominance) Line 1a and C Line 1b data of the first and second lines of the first field of the sprite picture received via a bus 51 from the Data Pipe 50. The line chrominance data comprises 8 bits (bits 7-0) of data for each pixel of a line. The third double line buffer 55 is used for storing Y/G (luminance) line 2a data and Y/G line 2b data of first and second lines of a second field of a sprite picture received via the bus 49 from the Data Pipe 50. The line luminance data comprises 10 bits (bits 9-0) of data and control for each pixel of a line. It is to be understood that the Lines 1a and 2a of the first and third double line buffers 53 and 55 store first and second horizontal lines of pixel data, respectively, where the first and second horizontal lines are adjacent lines within separate fields of the sprite picture in an interlaced display format. Similarly, Lines 1b and 2b of the first and third double line buffers 53 and 55 store third and fourth horizontal lines of pixel data, respectively, where the third and fourth horizontal lines are adjacent lines within separate fields of the sprite picture in an interlaced display format. In other words, the first and third double line buffers 53 and 55 sequentially store luminance data and control for, for example, pixels of a pair of odd and even lines, respectively, of respective first and second fields, or vice versa, of the sprite picture during a scanning of an interlaced display format. The second double line buffer 54 stores the chrominance data for the data of lines stored in the double line buffer 53. A chrominance double line buffer (not shown) similar to double line buffer 54 can be provided for double line buffer 55, but it is not necessary for reasons of economy and unimportance in a Convolver that will be explained hereinafter.

The output data from the first double line buffer 53 comprises ten bits of luminance data and control for each pixel of the lines stored therein which is outputted in parallel for each pixel over a bus designated LINE 1 to circuitry in FIG. 3. The output data from the second double line buffer 54 comprises eight bits of chrominance data for each pixel of the lines stored therein which is outputted in parallel for each pixel over a bus designated LINE 1c to circuitry in FIG. 3. The output data from the third double line buffer 55 comprises ten bits of luminance data and control for each pixel of the lines stored therein which is outputted in parallel for each pixel over a bus designated LINE 2 to circuitry in FIG. 3 and to the Y/G Line 0 Buffer 58. The Y/G Line 0 Buffer 58 functions to delay the line data outputted by the third double line buffer 55 by one horizontal line period to provide a delayed line output comprising ten bits of luminance data and control for each pixel of the line stored therein which is outputted in parallel over a bus designated LINE 0 to circuitry in FIG. 3. It is to be understood that at a sampling rate of 13.5 MHz for the NTSC standard television display, there are 858 pixels per line of the picture of which only about 704 pixels are actually displayed, and that there are 525 horizontal lines of pixels in two fields of a picture of which about 440–500 lines are normally seen depending on the television receiver used.

Figure 4:
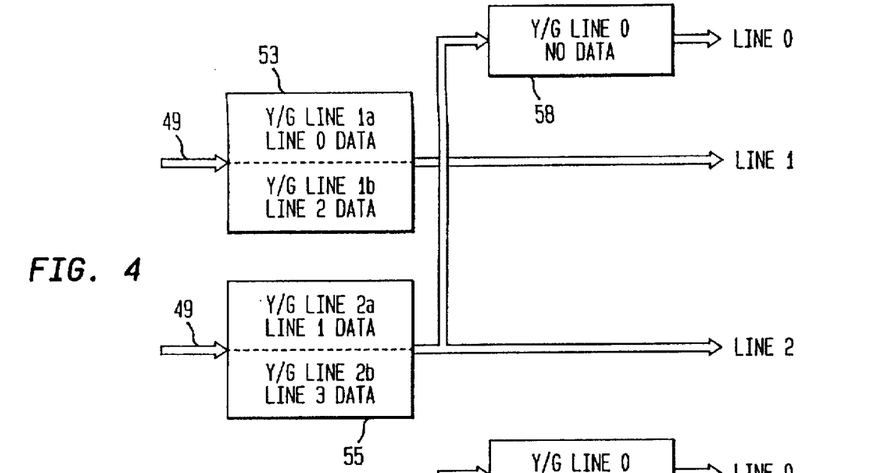
FIGS. 4, 5, and 6 illustrate the operation of a Pixel Assembly Buffer forming part of the first portion of the Video Processing Circuitry of FIG. 3 in accordance with the present invention.
Figure 5:
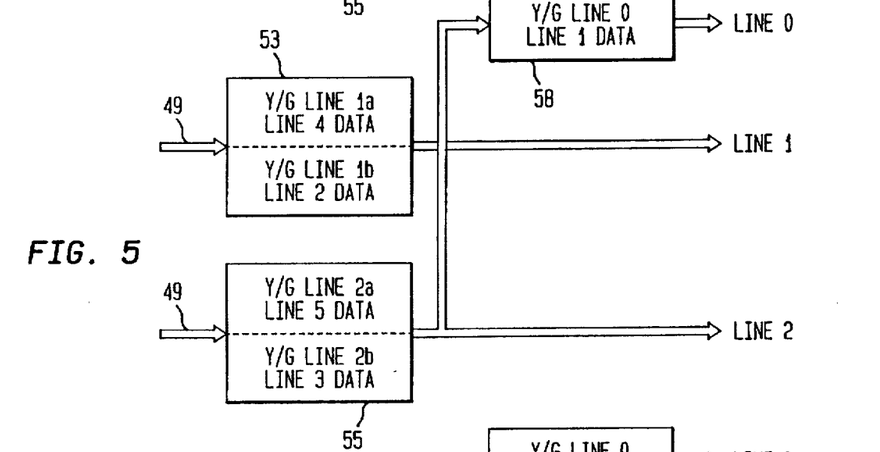
Figure 6:
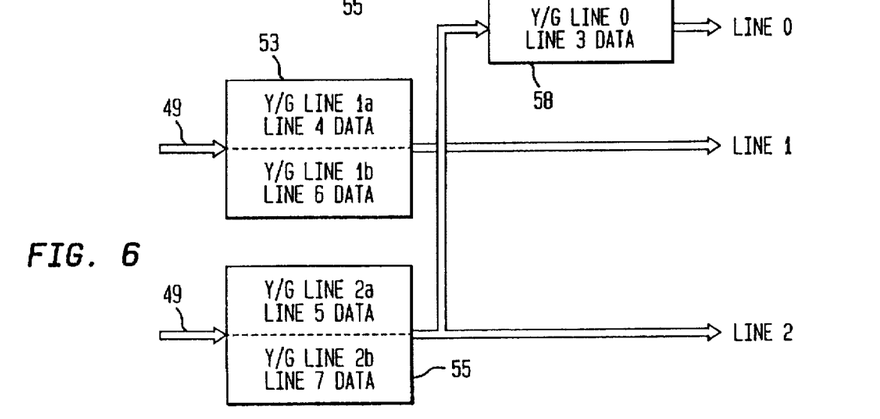

Turning now to FIGS. 4, 5, and 6, there is shown an exemplary sequence of operation for the first and third double line buffers 53 and 55, respectively, and the Y/G Line 0 Buffer 58 of the Pixel Assembly Buffer 52 of FIG. 2 in accordance with the present invention. It is to be understood that in a normal operation of the double line buffers 53 and 55, a horizontal line of pixel data in a first field is inputted to one half of the first double line buffer 53 concurrent with a horizontal line of pixel data in a second field being inputted to one half of the third double line buffer 55. Concurrent with the inputting of horizontal lines of pixel data into first halves of the first and third double line buffers 53 and 55, horizontal lines of pixel data previously stored in the other halves of the first and third double line buffers 53 and 55 are read out on output LINES 1 and 2, respectively. In other words, for the first double line buffer 53, a first horizontal line of pixel data from the first field is inputted to, for example, the Y/G LINE 1a portion of the first double line buffer 53, and during a next horizontal line period a second horizontal line of pixel data from a first field of a frame is inputted to the Y/G LINE 1b portion of the first double line buffer 53 while the first horizontal line of pixel data from the Y/G LINE 1a portion is read out onto output LINE 1. During a next horizontal line period, a third horizontal line of pixel data from the first field is inputted to the Y/G LINE 1a portion of the first double line buffer 53 while the second horizontal line of pixel data from the Y/G LINE 1b portion is read out onto output LINE 1. Concurrently, first, second, and third horizontal lines of pixel data from a second field of the frame are similarly read into the third double line buffer 55 and outputted therefrom onto output LINE 2.

FIG. 4 shows an end point of an initialization stage of the Pixel Assembly Buffer 52 after the subscriber cable box unit 10 of FIG. 1 is first turned on. More particularly, on turn on, pixel data for a horizontal line 0 of a first field and pixel data for a horizontal line 1 of a second field are inputted to the Y/G line 1a portion of the first double line buffer 53 and the Y/G line 2a portion of the double line buffer 55, respectively, during a first horizontal line period. During a second horizontal line period, pixel data for a horizontal line 2 of a first field and pixel data for a horizontal line 3 of a second field are inputted to the Y/G line 1b portion of the first double line buffer 53 and the Y/G line 2b portion of the third double line buffer 55, respectively, while the pixel data for horizontal lines 0 and 1 are read out of Y/G line 1a portion of the first double line buffer 53 and the Y/G line 2a portion of the third double line buffer 55, respectively, on respective output LINES 1 and 2. Concurrent therewith, the pixel data for a horizontal line 1 from the Y/G line 2a portion of the third double line buffer 55 is inputted to Y/G Line 0 Buffer 58. Since the Y/G Line 0 Buffer 58 functions to delay horizontal line data stored therein by one horizontal line period, and the Buffer 58 had no data stored therein upon initialization, the output therefrom on output LINE 0 includes no valid data.

FIG. 5 continues the loading and outputting process after the initialization steps shown in FIG. 4. More particularly, pixel data for a horizontal line 4 of a first field and pixel data for a horizontal line 5 of a second field are inputted to the Y/G line 1a portion of the first double line buffer 53 and the Y/G line 2a portion of the third double line buffer 55, respectively, during a third horizontal line period. Concurrent therewith, the pixel data for the horizontal lines 2 and 3 are read out of Y/G line 1b portion of the first double line buffer 53 and the Y/G line 2b portion of the third double line buffer 55, respectively, on their respective output LINES 1 and 2. Concurrent therewith, the pixel data for the horizontal line 3 from the Y/G line 2b portion of the third double line buffer 55 is inputted to Y/G Line 0 Buffer 58 while the previously stored pixel data for the horizontal line 1 data is outputted on output LINE 0. Therefore, the Buffers 58, 53, and 55 are outputting pixel data for the horizontal lines 1, 2, and 3, respectively, for a sprite on respective output LINES 0, 1, and 2 during the third horizontal line period, where the pixel data for the horizontal lines 1 and 3 are part of the second field and the pixel data for the horizontal line 2 is part of the first field of a sprite picture that were stored in the Graphics Memory 38 (shown in FIGS. 1 and 2).

FIG. 6 continues the loading and outputting process from the step shown in FIG. 5. More particularly, pixel data for a horizontal line 6 of a first field and pixel data for a horizontal line 7 of a second field of a sprite are inputted to the Y/G horizontal line 1b portion of the first double line buffer 53 and the Y/G horizontal line 2b portion of the third double line buffer 55, respectively, during a fourth horizontal line period. Concurrent therewith, the pixel data for the horizontal lines 4 and 5 of the sprite are read out of Y/G horizontal line 1a portion of the first double line buffer 53 and the Y/G horizontal line 2a portion of the third double line buffer 55, respectively, on respective output LINES 1 and 2. Concurrent therewith, the pixel data for the horizontal line 5 from the Y/G line 2a portion of the third double line buffer 55 is inputted to Y/G Line 0 Buffer 58 while the previously stored pixel data for the horizontal line 3 data is outputted on output LINE 0. Therefore, the Buffers 58, 53, and 55 are outputting pixel data for the horizontal lines 3, 4, and 5, respectively, on respective output LINES 0, 1, and 2 during the fourth horizontal line period, where the data for the horizontal lines 3 and 5 are part of the second field of the sprite picture while the data for the horizontal line 4 is obtained from the first field of the sprite picture that were stored in the Graphics Memory 38 (shown in FIGS. 1 and 2).

From FIGS. 5 and 6, it can be seen that after initialization (FIG. 4), the pixel data on the output LINE 1 represents data for sequential horizontal lines (e.g., even numbered horizontal lines (0–254) of an NTSC standard picture) of a first field of the two fields of a frame for an NTSC interlaced display. After the exemplary even numbered horizontal lines of the first field have been sequentially outputted on the output LINE 1 during sequential horizontal line periods, the output continues with sequentially numbered horizontal lines (e.g., odd numbered horizontal lines 1–255 of an NTSC standard picture) of the second field of the frame in the manner found for scanning an interlaced display. Although not shown in FIGS. 4–6, it is to be understood that the chrominance data is outputted on output LINE 1c from the second double line buffer 54 shown in FIG. 2, concurrent with the associated luminance pixel data for each horizontal line being outputted on output LINE 1.

Turning now to FIG. 3, there is shown a block diagram of a second portion of a Video Processing Circuitry 46 found in the subscriber cable box unit 10 of FIG. 1 in accordance with the present invention. The second portion of the Video Processing Circuitry 46 comprises Color Palette circuitry 60, a YC to YUV Demultiplexer 62, a Multiplexer/Fader (MUX./FADER) 64, a 3:1 Multiplexer and Control (3:1 MUX. & CONT.) 66, and a Convolver 68. The 10-bit pixel data (bits 9:0) propagating on each of LINES 0, 1, 2 from the output of the Pixel Assembly Buffer 52 of FIG. 2 for corresponding pixels in three adjacent horizontal lines of a sprite picture are received at separate inputs of each of the Color Palette circuitry 60, the YC to YUV Demultiplexer 62 and the 3:1 Multiplexer and Control 66. More particularly, bits 7-0 of the parallel 10-bit/pixel output from the Pixel Assembly Buffer 52 for each of output LINES 0, 1, and 2 are received at the inputs of the Color Palette circuitry 60 and the YC to YUV Demultiplexer 62, while bits 9 and 8 of the parallel 10-bit/pixel output from the Pixel Assembly Buffer 52 for each of output LINES 0, 1, and 2 are received at the inputs of the 3:1 Multiplexer and Control 66. Additionally, the YC to YUV Demultiplexer 62 receives the chrominance data bits 7-0 outputted in parallel on output LINE 1c from the Pixel Assembly Buffer 52 since the chrominance data is only used when the sprite pixel data relates to a True Color sprite signal. More particularly, where sprite data is encoded as a color palette signal, the code itself defines the color, and chrominance data is not required as is needed with a true color video signal.

The Color Palette circuitry 60 functions to detect when the 8 bits (bits 7:0) of parallel received pixel data on each of output LINES 0, 1, and 2 represent separate codes for particular colors of a color palette, and to convert those color palette codes into an output signal on bus 61 representing a 24-bit YUV multiplexed color palette signal for three 8-bit pixel data received for those three lines. Color Palette circuitry 60 is a well known device, and any suitable circuit can be used therefor. The YC to YUV Demultiplexer 62 detects when 8 bits (bits 7:0) of parallel received data for pixels on each of the output LINES 0, 1, and 2 from the Pixel Assembly Buffer 52 represents true color data (e.g., a sprite obtained directly from a television picture), and also uses the 8-bit chrominance data obtained via output LINE 1c from the Pixel Assembly Buffer 52 to generate a 24-bit True Color YUV output signal for pixels of the three lines for transmission on bus 63.

The Multiplexer/Fader (MUX./FADER) 64 receives, at separate inputs thereof, each of the 24-bit color palette YUV data signals propagating on a bus 61 from the Color Palette circuitry 60, the 24-bit true color YUV data signals propagating on bus 63 from the YC to YUV Demultiplexer 62, and 24-bit YUV live video signals on a bus 59. The Multiplexer/Fader 64 is responsive to control signals on a lead 67 from the 3:1 Multiplexer and Control 66 to output one of the three input signals (24-bit color palette YUV, 24-bit true color YUV, or 24-bit live video YUV) received at the Multiplexer/Fader 64 during each pixel period as digitized YUV mixed output signals on a bus 65. More particularly, the 3:1 Multiplexer and Control 66 determines from the bits 9 and 8 received on the output LINES 0, 1, and 2 from the Pixel Assembly Buffer 52 whether the pixel data from the Pixel Assembly Buffer 52 on the output LINES 0, 1, and 2 represents color palette data, true color data, or data (non-valid data) for a pixel that is not part of a sprite to be overlaid on a live video signal, and, therefore, the live video signal should be used for that pixel instead of the color palette or true color data received from the Pixel Assembly Buffer 52. As a result of such control information obtained from bits 9 and 8 of output LINES 0, 1, and 2 from the Pixel Assembly Buffer 52, the 3:1 Multiplexer and Control 66 sends control signals over the lead 67 to the Multiplexer/Fader 64 to select the correct input data for each pixel of a picture to be displayed on a remote NTSC or PAL television receiver (not shown). The Convolver 68 uses sequential sets of three pixel data values received in the signal from the Multiplexer/Fader 64 on bus 65 to provide an 8-bit weighted output signal for pixel data for a central pixel in a 3-by-3 matrix of corresponding pixels in three adjacent lines of a television picture or provide the signal from the Multiplexer/Fader 64 on bus 65 as a YUV output signal on bus 47 depending on control signals from the 3:1 Multiplexer and Control 66 over a lead 69.

Figure 7:
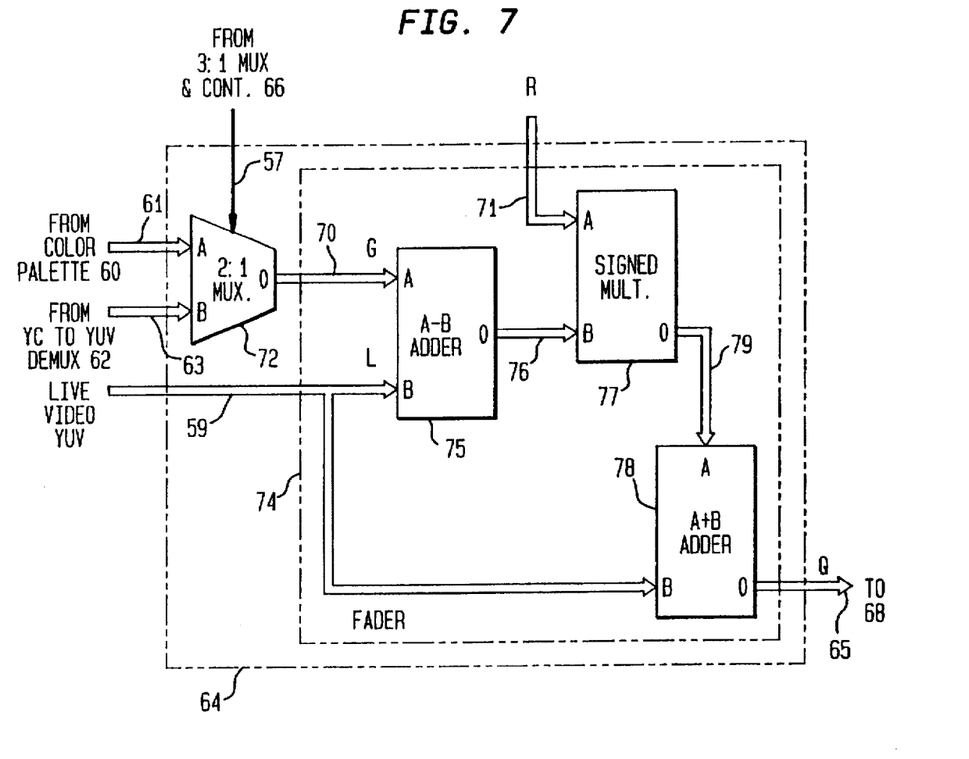
FIG. 7 is a block diagram of an exemplary Multiplexer/Fader forming part of a second portion of the Video Processing Circuitry shown in FIG. 3.

Referring now to FIG. 7, there is shown a block diagram of an exemplary Multiplexer/Fader circuit 64 (shown within a dashed line rectangle) which comprises a 2:1 Multiplexer (MUX.) 72, and a Fader 74 (shown within a dashed line rectangle)- The Fader 74 comprises an A−B Adder 75, a Signed Multiplier (SIGNED MULT.) 77, and an A+B Adder 78. The 2:1 Multiplexer receives each of the Graphic data signals from the Color Palette 60 on bus 61 at a first input terminal (A), and the Graphic data signals from the YC to YUV Demultiplexer 62 on bus 63 at a second input terminal (B). A control signal on lead 67 from the 3:1 Multiplexer and Control 66 selects which of the two Graphic input signals (from input terminal A or B) will be output from the 2:1 Multiplexer 72 at output terminal (O). Pixel Graphic output signals (Y, U, or V) from an output terminal (O) of the 2:1 Multiplexer 72 (designated G) on a bus 70 are received at a first input terminal (A) of the A−B Adder 75 of the Fader 74. A live video YUV signal (Y, U, or V) (designated L) is received from a bus 59 at a second input terminal (B) of the A−B Adder 75. The pixel data values of the A terminal input data from the 2:1 Multiplexer 72 less the data values of the live video YUV pixel data received the B input terminal is provided as an output at an output terminal (O) of the A−B adder 75. The Signed Multiplier 77 receives from, for example, a register (not shown) a 9-bit changeable ratio control value (R) on a bus 71 at a first input terminal (A), and the output from the A−B Adder 75 on a bus 76 at a second input terminal (B). The resultant multiplied value of the ratio control value (R) on the bus 71 and the Graphic signal output data from the A−B Adder 75 on the bus 76 is output at an output terminal (O) on a bus 79 to a first input terminal (A) of the A+B Adder 78. The live video signal (Y, U, or V) on bus 59 is received at a second input terminal (B) of A+B Adder 78, and the sum of the two input signal values are provided as a output signal (designated Q) on the bus 65 to the Convolver 68 (shown in FIG. 3).

The Fader 74 functions to fade a graphic signal for a sprite in or out so that the graphic does not appear or disappear instantaneously over the live a video signal. In other words, for a graphic fade-in, the Fader 74 causes the graphic to appear with increasing intensity on a television receiver while the live video signal decreases in intensity in the area of the graphic over a short period of time so that the graphic is totally visible. Similarly, for a graphic fade-out, the Fader 74 causes the graphic to appear with decreasing intensity on a television receiver while the live video signal increases in intensity in the area of the graphic over a short period of time until the graphic disappears. The operation of the Fader 74 can be explained in accordance with the following algorithms. For the following, an exemplary 9-bit fade multiplier (R) bus 71 is defined as follows. R is the fade control value and ranges from 0 to 256. From the above definitions, $$Q = [(R/256)*G] + [(1 - R/256)*L], \text{ and} \qquad \text{Eq. 1}$$
$$= L + [(G - L)*R]/256,$$

where "L" is a pixel value of the live video, "G" is a pixel value of the sprite overlay, and the symbol "*" represents a multiplying function. From Equation 1 above, as the ratio used for the multiplying value R changes, the intensity of the graphic and live video signals change in a opposite directions.

Figure 8:
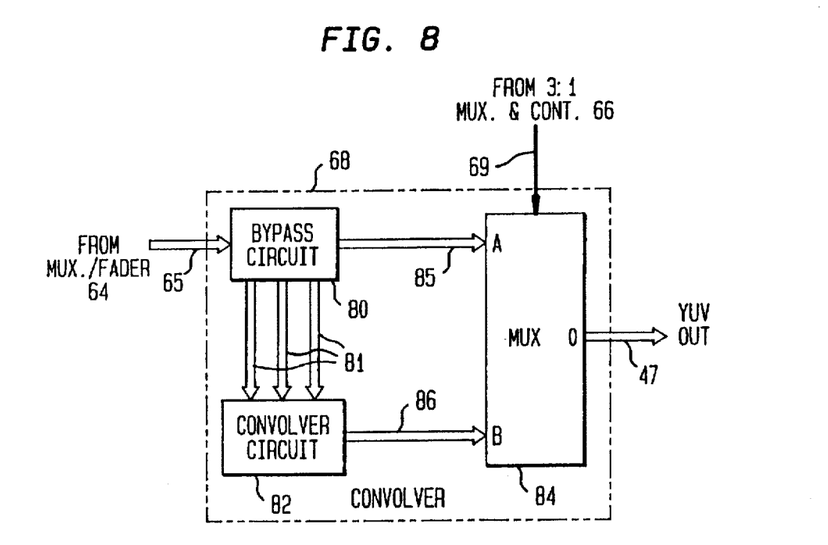
FIG. 8 is a block diagram of an exemplary arrangement of a Convolver forming part of the second portion of the Video Processing Circuitry shown in FIG. 3.

Referring now to FIG. 8, there is shown a block diagram of the Convolver 68 shown in FIG. 3. The Convolver 68 (shown within a dashed line rectangle) comprises a Bypass circuit 80, a convolver circuit 82, and a Multiplexer (MUX.) 84. The Bypass circuit 80 receives sequential pixel data from the Multiplexer/Fader 64 (shown in FIGS. 3 and 7) on bus 65, and concurrently generates therefrom data on buses 81 for three pixels in a vertical of a sprite to be displayed on a television receiver. More particularly, the three pixels are obtained from corresponding pixels in three adjacent lines of both fields of a frame making up a sprite picture. The three pixel data values are obtained by any suitable arrangement such as a plurality of delay circuits operating from a pixel clock or a three times pixel clock. The three pixel data values are received via buses 81 by the Convolver circuit 82. The sequential pixel data from the Multiplexer/Fader 64 is received by the Bypass circuit 80 on the bus 65. The sequential pixel data from the Multiplexer/Fader 64 passes through the Bypass circuit 80 and is provided to a first input (A) of the Multiplexer 84 via a bus 85. Still further, the Bypass circuit 80 transmits sequential sets of three pixel data values from separate outputs thereof to separate inputs of Convolver circuit 82 on buses 81. The Convolver circuit 82 provides an 8-bit weighted output signal for pixel data for a central pixel in a 3-by-3 matrix of corresponding pixels in three adjacent lines of a television picture at an output thereof to a second input (B) of the Multiplexer 84 via a bus 86. The Multiplexer 84 selects the signals at the first (A) or second (B) inputs for transmission to the output terminal (O) and bus 47 depending on control signals from the 3:1 Multiplexer and Control 66 over a lead 69.

As is disclosed in the copending patent application Ser. No. 08/523,395 filed on the same date as the present application for the present inventors and incorporated herein by reference, the Convolver circuit 82 effectively multiplies (using just adders and delays) the three pixels of a vertical received on buses 81 in a 3-by-3 matrix of pixels with predetermined weight values, and provides an averaged output signal for the central pixel of the 3-by-3 matrix to a second input (B) of the Multiplexer 84. This process continues for each pixel of a central row (output LINE 1 of the Pixel Assembly Buffer 52 of FIG. 2) as the sprite data for the corresponding pixels of the three adjacent lines as the pixel data progresses (shifts) horizontally across the sprite picture for three adjacent lines.

It is to be appreciated and understood that the specific embodiments of the invention described hereinbefore are merely illustrative of the general principles of the invention. Various modifications may be made by those skilled in the art which are consistent with the principles set forth. For example, although the present invention has been described hereinabove for use in a subscriber cable box unit 10, it is to be understood that the present invention can be used at, for example, a production editing station prior to the television signal being broadcast. In other words, the present invention can be used in television productions for creating initial products prior to their being broadcast rather than manipulating the television signal afterwards at a remote subscriber's location. This is possible because the quality and the resolution of the picture will be the same regardless of whether the editing is performed during production or thereafter at the subscriber's location. Therefore, it does not matter if the quality or resolution might be better in a non-edited television production if the editing is performed somewhere prior to the production being seen on the subscriber's interlaced television set.

What is claimed is:

1. Apparatus for processing mixed video and graphic signals for display on a standard interlaced television receiver comprising:

buffering and processing means responsive to a reception of first and second horizontal lines of sprite pixel data from first and second fields, respectively, of each of one or more sprites to be selectively displayed in separate selected predetermined areas of a display of the standard interlaced television receiver, for generating therefrom first, second, and third output signals including sequential sprite pixel data for three adjacent horizontal lines of a picture for display on the television receiver, where pixel data for sprites of a highest priority are outputted for each pixel position of the first, second, and third output signal at any instant of time when sprites overlap an area of the display on the television receiver, and the first and third output signals include sprite pixel data for lines of one of the first and second fields, and the second output signals includes sprite pixel data for lines of the other one of the first and second fields and includes chrominance data when the sprite data relates to the true color format; and convolving means for receiving the first, second, and third output signals from the buffering and processing means and generating therefrom an output signal providing a weighted average for a central pixel of a predetermined matrix of pixel data for transmission to the television receiver when a sprite is included in a pixel area of the display of the television receiver, where the central pixel is part of the second output signal from the buffering and processing means, and for transmitting a live video signal to the display of the television receiver when no sprite is included in a pixel area of the display of the television receiver.

2. The apparatus of claim 1 wherein the apparatus further comprises digital memory means for storing, and subsequently transmitting an output signal comprising, sprite data for each of one or more sprites to be selectively displayed in selected predetermined areas of a display of the standard interlaced television receiver, the sprite data comprising either one of a true color video or a color palette data format for a first and second field of a sprite picture to be displayed on the television receiver, and each of the one or more sprites has a predetermined priority when there is more than one sprite.

3. The apparatus of claim 1 wherein the buffering and processing means comprises:

means for concurrently reading a first one and a second one of adjacent horizontal lines of pixel data from the digital memory means for each of the one or more sprites to be displayed on the first and second lines and for outputting pixel data for each pixel of the first one and second one of the lines forming part of sprite having the highest priority of the one or more sprites, where the first line is a line from one of the first and second fields and the second lines is a line from the other one of the first and second fields, and each of the first and second ones of the lines of the one and other one of the fields are outputted in sequence.

4. The apparatus of claim 3 wherein the buffering and processing means further comprises a pixel assembly buffer comprising:

first double buffering means for storing pixel data having a highest priority for each pixel of the one or more sprites of a first and a second line of the first ones of the horizontal lines that are received in sequence, and for outputting pixel data for the first one of the horizontal lines received previously in sequence over a first output bus to the convolving means while a next sequential one of the first one of the horizontal lines is being received;

second double buffering means for storing pixel data having a highest priority for each pixel of the one or more sprites of two of the second ones of the horizontal lines that are received in sequence, and for outputting pixel data for the second one of the horizontal lines received previously in sequence over a second output bus to the convolving means while a next sequential one of the second one of the horizontal lines is being received; and a delay buffering means, for concurrently receiving pixel data for the second one of the horizontal lines being outputted by the second double buffering means over the second output bus, and for storing and delaying the received second one of the horizontal lines by one horizontal line period before transmitting the stored pixel data for the stored second one of the horizontal lines over a third bus to the convolving means while receiving another second one of the horizontal lines from the second double buffering means.

5. The apparatus of claim 4 wherein the first and second double buffering means store pixel data relating to a luminance (Y) component of each pixel of the first one and second one of the horizontal lines, respectively.

6. The apparatus of claim 5 wherein the pixel assembly buffer further comprises:

a third double buffering means for storing chrominance (C) pixel data having a highest priority for each pixel of the one or more sprites of a first and a second line of the first ones of the horizontal lines that are received in sequence when the sprite data is stored in a true color video format, and for outputting chrominance pixel data for the first one of the horizontal lines received previously in sequence over a fourth output bus while chrominance pixel data for a next sequential one of the first one of the horizontal lines is being received.

7. The apparatus of claim 6 wherein the buffering and processing means further comprises:

color palette converting means responsive to the horizontal line signals on the first, second, and third buses from the pixel assembly buffer for converting pixel data in a color palette format into a YUV color palette output signal;

a YC to YUV demultiplexer responsive to the luminance and chrominance horizontal line signals on the first, second, third, and fourth buses from the pixel assembly buffer for converting pixel data in a true color YC format into a true color YUV output signal; and multiplexing means responsive to output signals from the color palette converting means and the YC to YUV demultiplexer, and a live video signal, for selecting one of these three signals for each pixel for each of three adjacent horizontal lines of data of the first and second fields for transmission to the convolving means in accordance with data provided for each pixel received on the first, second, and third buses from the pixel assembly buffer.

8. The apparatus of claim 7 wherein:

a luminance value of each pixel of a horizontal line data for the one or more sprites is transmitted over the first, second, and third buses from the pixel assembly buffer as a first plurality of bits of a pixel data word, and a designation of whether each pixel of the one or more sprites is coded in a color palette or true color format and whether the pixel forms part of the one or more sprites is coded in a second plurality of bits of the pixel data word; and the second plurality of bits of the pixel data word are used by the multiplexing means for selecting the one of the output signals from the color palette converting means and the YC to YUV demultiplexer, and a live video signal for transmission to the convolving means.

9. Apparatus for processing mixed video and graphic signals for display on a standard interlaced television receiver comprising:

digital memory means for storing, and subsequently transmitting an output signal comprising, sprite data for each of one or more sprites to be selectively displayed in selected predetermined areas of a display of the standard interlaced television receiver, the sprite data comprising either one of a true color video or a color palette data format for a first and second field of a sprite picture to be displayed on the television receiver, and each of the one or more sprites has a predetermined priority when there is more than one sprite;

buffering and processing means responsive to the output signal from the digital memory means for generating therefrom first, second, and third output signals including sequential sprite pixel data for three adjacent horizontal lines of a picture for display on the television receiver, where pixel data for sprites of a highest priority are outputted for each pixel position of the first, second, and third output signal at any instant of time when sprites overlap an area of the display on the television receiver, and the first and third output signals include sprite pixel data for lines of one of the first and second fields, and the second output signals includes sprite pixel data for lines of the other one of the first and second fields and includes chrominance data when the sprite data relates to the true color format; and convolving means for receiving the first, second, and third output signals from the buffering and processing means and generating therefrom an output signal providing a weighted average for a central pixel of a predetermined matrix of pixel data for transmission to the television receiver when a sprite is included in a pixel area of the display of the television receiver, where the central pixel is part of the second output signal from the buffering and processing means, and for transmitting a live video signal to the display of the television receiver when no sprite is included in a pixel area of the display of the television receiver.

10. The apparatus of claim 9 wherein the buffering and processing means comprises:

means for concurrently reading a first one and a second one of adjacent horizontal lines of pixel data from the digital memory means for each of the one or more sprites to be displayed on the first and second lines and for outputting pixel data for each pixel of the first one and second one of the lines forming part of sprite having the highest priority of the one or more sprites, where the first line is a line from one of the first and second fields and the second lines is a line from the other one of the first and second fields, and each of the first and second ones of the lines of the one and other one of the fields are outputted in sequence.

11. The apparatus of claim 10 wherein the buffering and processing means further comprises a pixel assembly buffer comprising:

first double buffering means for storing pixel data having a highest priority for each pixel of the one or more sprites of a first and a second line of the first ones of the horizontal lines that are received in sequence, and for outputting pixel data for the first one of the horizontal lines received previously in sequence over a first output bus to the convolving means while a next sequential one of the first one of the horizontal lines is being received;

second double buffering means for storing pixel data having a highest priority for each pixel of the one or more sprites of two of the second ones of the horizontal lines that are received in sequence, and for outputting pixel data for the second one of the horizontal lines received previously in sequence over a second output bus to the convolving means while a next sequential one of the second one of the horizontal lines is being received; and a delay buffering means, for concurrently receiving pixel data for the second one of the horizontal lines being outputted by the second double buffering means over the second output bus, and for storing and delaying the received second one of the horizontal lines by one horizontal line period before transmitting the stored pixel data for the stored second one of the horizontal lines over a third bus to the convolving means while receiving another second one of the horizontal lines from the second double buffering means.

12. The apparatus of claim 11 wherein the first and second double buffering means store pixel data relating to a luminance (Y) component of each pixel of the first one and second one of the horizontal lines, respectively.

13. The apparatus of claim 12 wherein the pixel assembly buffer further comprises:

a third double buffering means for storing chrominance (C) pixel data having a highest priority for each pixel of the one or more sprites of a first and a second line of the first ones of the horizontal lines that are received in sequence when the sprite data is stored in a true color video format, and for outputting chrominance pixel data for the first one of the horizontal lines received previously in sequence over a fourth output bus while chrominance pixel data for a next sequential one of the first one of the horizontal lines is being received.

14. The apparatus of claim 13 wherein the buffering and processing means further comprises:

color palette converting means responsive to the horizontal line signals on the first, second, and third buses from the pixel assembly buffer for converting pixel data in a color palette format into a YUV color palette output signal;

a YC to YUV demultiplexer responsive to the luminance and chrominance horizontal line signals on the first, second, third, and fourth buses from the pixel assembly buffer for converting pixel data in a true color YC format into a true color YUV output signal; and multiplexing means responsive to output signals from the color palette converting means and the YC to YUV demultiplexer, and a live video signal, for selecting one of these three signals for each pixel for each of three adjacent horizontal lines of data of the first and second fields for transmission to the convolving means in accordance with data provided for each pixel received on the first, second, and third buses from the pixel assembly buffer.

15. The apparatus of claim 14 wherein:

a luminance value of each pixel of a horizontal line data for the one or more sprites is transmitted over the first, second, and third buses from the pixel assembly buffer as a first plurality of bits of a pixel data word, and a designation of whether each pixel of the one or more sprites is coded in a color palette or true color format and whether the pixel forms part of the one or more sprites is coded in a second plurality of bits of the pixel data word; and the second plurality of bits of the pixel data word are used by the multiplexing means for selecting the one of the output signals from the color palette converting means and the YC to YUV demultiplexer, and a live video signal for transmission to the convolving means.

16. Apparatus for processing mixed video and graphic signals for display on a standard interlaced television receiver comprising:

digital memory means for storing, and subsequently transmitting an output signal comprising, sprite data for each of one or more sprites to be selectively displayed in selected predetermined areas of a display of the standard interlaced television receiver, the sprite data comprising either one of a true color video or a color palette data format for a first and second field of a sprite picture to be displayed on the television receiver, and each of the one or more sprites has a predetermined priority when there is more than one sprite;

a memory controller for causing sprite data of the first and second fields to be read into predetermined locations of the digital memory means and to be subsequently selectively read out of the digital memory means as a memory output signal including a horizontal line of sprite data of the first field and an adjacent line of sprite data from the second field;

buffering and processing means responsive to the memory output signal from the memory controller for generating therefrom first, second, and third output signals including sequential sprite pixel data for three adjacent horizontal lines of a picture for display on the television receiver, where pixel data for sprites of a highest priority are outputted for each pixel position of the first, second, and third output signal at any instant of time when sprites overlap an area of the display on the television receiver, and the first and third output signals include sprite pixel data for lines of one of the first and second fields, and the second output signals includes sprite pixel data for lines of the other one of the first and second fields and includes chrominance data when the sprite data relates to the true color format; and convolving means for receiving the first, second, and third output signals from the buffering and processing means and generating therefrom an output signal providing a weighted average for a central pixel of a predetermined matrix of pixel data for transmission to the television receiver when a sprite is included in a pixel area of the display of the television receiver, where the central pixel is part of the second output signal from the buffering and processing means, and for transmitting a live video signal to the display of the television receiver when no sprite is included in a pixel area of the display of the television receiver.

17. The apparatus of claim 16 wherein the buffering and processing means comprises:

means for concurrently reading a first one and a second one of adjacent horizontal lines of pixel data from the digital memory means for each of the one or more sprites to be displayed on the first and second lines and for outputting pixel data for each pixel of the first one and second one of the lines forming part of sprite having the highest priority of the one or more sprites, where the first line is a line from one of the first and second fields and the second lines is a line from the other one of the first and second fields, and each of the first and second ones of the lines of the one and other one of the fields are outputted in sequence.

18. The apparatus of claim 17 wherein the buffering and processing means further comprises a pixel assembly buffer comprising:

first double buffering means for storing pixel data having a highest priority for each pixel of the one or more sprites of a first and a second line of the first ones of the horizontal lines that are received in sequence, and for outputting pixel data for the first one of the horizontal lines received previously in sequence over a first output bus to the convolving means while a next sequential one of the first one of the horizontal lines is being received;

second double buffering means for storing pixel data having a highest priority for each pixel of the one or more sprites of two of the second ones of the horizontal lines that are received in sequence, and for outputting pixel data for the second one of the horizontal lines received previously in sequence over a second output bus to the convolving means while a next sequential one of the second one of the horizontal lines is being received; and a delay buffering means, for concurrently receiving pixel data for the second one of the horizontal lines being outputted by the second double buffering means over the second output bus, and for storing and delaying the received second one of the horizontal lines by one horizontal line period before transmitting the stored pixel data for the stored second one of the horizontal lines over a third bus to the convolving means while receiving another second one of the horizontal lines from the second double buffering means.

19. The apparatus of claim 18 wherein the first and second double buffering means store pixel data relating to a luminance (Y) component of each pixel of the first one and second one of the horizontal lines, respectively.

20. The apparatus of claim 19 wherein the pixel assembly buffer further comprises:

a third double buffering means for storing chrominance (C) pixel data having a highest priority for each pixel of the one or more sprites of a first and a second line of the first ones of the horizontal lines that are received in sequence when the sprite data is stored in a true color video format, and for outputting chrominance pixel data for the first one of the horizontal lines received previously in sequence over a fourth output bus while chrominance pixel data for a next sequential one of the first one of the horizontal lines is being received.

21. The apparatus of claim 20 wherein the buffering and processing means further comprises:

color palette converting means responsive to the horizontal line signals on the first, second, and third buses from the pixel assembly buffer for converting pixel data in a color palette format into a YUV color palette output signal;

a YC to YUV demultiplexer responsive to the luminance and chrominance horizontal line signals on the first, second, third and fourth buses from the pixel assembly buffer for converting pixel data in a true color YC format into a true color YUV output signal; and multiplexing means responsive to output signals from the color palette converting means and the YC to YUV demultiplexer, and a live video signal, for selecting one of these three signals for each pixel for each of three adjacent horizontal lines of data of the first and second fields for transmission to the convolving means in accordance with data provided for each pixel received on the first, second, and third buses from the pixel assembly buffer.

22. The apparatus of claim 21 wherein:

a luminance value of each pixel of a horizontal line data for the one or more sprites is transmitted over the first, second, and third buses from the pixel assembly buffer as a first plurality of bits of a pixel data word, and a designation of whether each pixel of the one or more sprites is coded in a color palette or true color format and whether the pixel forms part of the one or more sprites is coded in a second plurality of bits of the pixel data word; and the second plurality of bits of the pixel data word are used by the multiplexing means for selecting the one of the output signals from the color palette converting means and the YC to YUV demultiplexer, and a live video signal for transmission to the convolving means.

* * * * *